United States Patent
DeBie et al.

(10) Patent No.: US 8,037,029 B2
(45) Date of Patent: Oct. 11, 2011

(54) AUTOMATED RECORDS MANAGEMENT WITH HOLD NOTIFICATION AND AUTOMATIC RECEIPTS

(75) Inventors: Tod Andrew DeBie, Costa Mesa, CA (US); Ivan Chi Wei Lee, Burnaby (CA); Tina Joyce Lustig, Huntington Beach, CA (US); Bao Vu, Mission Viejo, CA (US); Hsien-Rong Yang, Mission Viejo, CA (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/546,542

(22) Filed: Oct. 10, 2006

(65) Prior Publication Data

US 2008/0086506 A1    Apr. 10, 2008

(51) Int. Cl.
*G06F 7/00* (2006.01)
(52) U.S. Cl. ........ 707/662; 707/663; 707/664; 707/665; 707/666; 707/667; 707/668; 705/342
(58) Field of Classification Search .................. None
See application file for complete search history.

(56) References Cited

U.S. PATENT DOCUMENTS

| | | | |
|---|---|---|---|
| 4,608,679 A | 8/1986 | Rudy et al. | |
| 4,675,856 A | 6/1987 | Rudy et al. | |
| 4,685,095 A | 8/1987 | Rudy et al. | |
| 5,144,556 A | 9/1992 | Wang et al. | |
| 5,710,921 A | 1/1998 | Hirose | |
| RE35,861 E | 7/1998 | Queen | |
| 5,813,009 A | 9/1998 | Johnson et al. | |
| 5,940,804 A | 8/1999 | Turley et al. | |
| 6,061,679 A | 5/2000 | Bournas et al. | |
| 6,141,754 A | 10/2000 | Choy | |
| 6,253,369 B1 | 6/2001 | Cloud et al. | |
| 6,314,437 B1 | 11/2001 | Starek et al. | |
| 6,338,074 B1 | 1/2002 | Poindexter et al. | |
| 6,347,299 B1 | 2/2002 | Holzman et al. | |
| 6,360,234 B2 | 3/2002 | Jain et al. | |
| 6,505,219 B1 | 1/2003 | MacLean et al. | |
| 6,553,365 B1 | 4/2003 | Summerlin et al. | |
| 6,581,069 B1 | 6/2003 | Robinson et al. | |
| 6,690,774 B1 | 2/2004 | Chang et al. | |
| 7,010,602 B2 | 3/2006 | Poindexter et al. | |
| 7,080,066 B1 | 7/2006 | Scheurich et al. | |
| 7,159,178 B2 | 1/2007 | Vogt et al. | |

(Continued)

FOREIGN PATENT DOCUMENTS

WO    9905632    2/1999

OTHER PUBLICATIONS

"Records Management Edition Training Guide," Laserfiche Institute, 2004.*

(Continued)

*Primary Examiner* — Tim T Vo
*Assistant Examiner* — Aaron Sanders
(74) *Attorney, Agent, or Firm* — Janaki K. Davda; Konard Raynes & Victor LLP

(57) ABSTRACT

A records management system and method includes sending periodic notifications to record owners and managers when their records are under a hold order. Also, return receipts in response to an e-mail message related to a record are automatically declared as records themselves and linked to the original record.

6 Claims, 4 Drawing Sheets

U.S. PATENT DOCUMENTS

| | | | |
|---|---|---|---|
| 7,213,022 | B2 | 5/2007 | Whelan et al. |
| 7,237,184 | B2 | 6/2007 | Ballard et al. |
| 7,321,886 | B2 | 1/2008 | Swaminathan et al. |
| 7,401,057 | B2 | 7/2008 | Eder |
| 7,428,724 | B2 | 9/2008 | Pike et al. |
| 7,496,860 | B2 | 2/2009 | Saxena et al. |
| 2001/0013004 | A1 | 8/2001 | Haris et al. |
| 2001/0039542 | A1 | 11/2001 | Okada et al. |
| 2002/0032689 | A1 | 3/2002 | Abbott |
| 2002/0055888 | A1 | 5/2002 | Beran et al. |
| 2002/0059466 | A1 | 5/2002 | Poindexter et al. |
| 2002/0137493 | A1* | 9/2002 | Dutta ............................. 455/414 |
| 2003/0023736 | A1 | 1/2003 | Abkemeier |
| 2003/0046369 | A1 | 3/2003 | Sim et al. |
| 2003/0093458 | A1 | 5/2003 | Poindexter et al. |
| 2003/0105738 | A1 | 6/2003 | Taketa et al. |
| 2003/0135559 | A1 | 7/2003 | Bellotti et al. |
| 2003/0182332 | A1 | 9/2003 | McBrearty et al. |
| 2003/0182380 | A1* | 9/2003 | Yabe et al. .................... 709/206 |
| 2003/0187878 | A1 | 10/2003 | Sandifer |
| 2003/0236788 | A1 | 12/2003 | Kanellos et al. |
| 2004/0039646 | A1 | 2/2004 | Hacker |
| 2004/0054685 | A1 | 3/2004 | Rahn et al. |
| 2004/0117358 | A1 | 6/2004 | von Kaenel et al. |
| 2004/0128182 | A1 | 7/2004 | Pepoon et al. |
| 2004/0168058 | A1 | 8/2004 | Margolus |
| 2004/0187140 | A1 | 9/2004 | Aigner et al. |
| 2004/0193740 | A1 | 9/2004 | Kasmirsky et al. |
| 2004/0230941 | A1 | 11/2004 | Marin et al. |
| 2004/0249871 | A1 | 12/2004 | Bazoon |
| 2004/0260769 | A1 | 12/2004 | Yamamoto |
| 2005/0027696 | A1 | 2/2005 | Swaminathan et al. |
| 2005/0044197 | A1 | 2/2005 | Lai |
| 2005/0055519 | A1 | 3/2005 | Stuart et al. |
| 2005/0076049 | A1 | 4/2005 | Qubti et al. |
| 2005/0080771 | A1 | 4/2005 | Fish |
| 2005/0149365 | A1 | 7/2005 | Johnson |
| 2005/0154723 | A1 | 7/2005 | Liang |
| 2005/0216448 | A1 | 9/2005 | Talib et al. |
| 2005/0222984 | A1 | 10/2005 | Radestock et al. |
| 2005/0222993 | A1 | 10/2005 | Ohtomo |
| 2005/0246276 | A1 | 11/2005 | Lee et al. |
| 2006/0004689 | A1 | 1/2006 | Chandrasekaran et al. |
| 2006/0047650 | A1 | 3/2006 | Freeman et al. |
| 2006/0085245 | A1 | 4/2006 | Takatsuka et al. |
| 2006/0085374 | A1 | 4/2006 | Mayes et al. |
| 2006/0149735 | A1 | 7/2006 | DeBie et al. |
| 2006/0179061 | A1 | 8/2006 | D'Souza et al. |
| 2006/0230044 | A1 | 10/2006 | Utiger |
| 2006/0282292 | A1 | 12/2006 | Brink et al. |
| 2007/0088585 | A1 | 4/2007 | Maguire |
| 2007/0088715 | A1 | 4/2007 | Slackman et al. |
| 2007/0088736 | A1 | 4/2007 | DeBie |
| 2007/0150445 | A1 | 6/2007 | DeBie |
| 2007/0168315 | A1 | 7/2007 | Covannon et al. |
| 2007/0192423 | A1* | 8/2007 | Karlson ........................ 709/206 |
| 2007/0239715 | A1 | 10/2007 | DeBie |
| 2007/0260619 | A1 | 11/2007 | Whelan et al. |
| 2007/0271308 | A1* | 11/2007 | Bentley et al. ................ 707/200 |
| 2007/0271517 | A1* | 11/2007 | Finkelman et al. ........... 715/742 |

OTHER PUBLICATIONS

AIIM—The ECM Association, "FilNet Minimizes Burden of Records Management Decisions with FileNet Records Manager", [online], 2005. [Retrieved on Jan. 2, 2008]. Retrieved from the Internet at <URL: http:www.aiim.org/article-docrep. asp?ID=28516>, 5 pp.

FileNet, "FileNet Records Manager Business White Paper", [online], May 2004. Retrieved from the Internet at <URL: http://www. documentaccess.net/download/rm_whitepaper.pdf>, 13 pp.

Wikipedia, "Hierarchical Storage Management", [online], [retrieved on Feb. 7, 2008]. Retrieved from the Internet at <URL: http://en. wikipedia.org/wiki/Hierarchical_storage_management>, 3 pp.

Wikipedia, "Information Lifecycle Management", [online], [retrieved on Feb. 7, 2008]. Retrieved from the Internet at <URL: http://en.wikipedia.org/wiki/Information_Lifecycle_Management>, 5 pp.

Compulink Management Center, Inc., "Laserfiche 7: Records Management Edition, Laserfiche Summary Report", revised Oct. 31, 2005, 7 pp.

Compulink Management Center, Inc., "LaserFiche Records Management Edition Training Guide", Aug. 31, 2004, 65 pp.

Compulink Management Center, Inc., "LaserFiche Workflow Suite Reviewer's Guide", Version 5, Jun. 22, 2001, 26 pp.

Compulink Management Center, Inc., "Requirements of a Records Management Application", [online], 2004, [retrieved on Jun. 13, 2007], retrieved from the Internet at <URL: http://web.archive.org/web/055608/http://www.laserfiche.com/resources/recordsmanagerguide/requirements.html>, 6 pp.

Eddin, A.S., "How to Write to Centera Storage Appliances", [online] Oct. 25, 2007, [retrieved on Aug. 15, 2008], retrieved from the Internet at <URL: http://www.codeproject.com/KB/winsdk/CenteraStorageAppliances.aspx?display=Print>, 26 pp.

Elmasri, R. and S.B. Navathe, "Fundamentals of Database Systems", Sep. 30, 1999, 3rd Ed., Addison-Wesley, Reading, MA, 8 pp.

EMC Corp., "EMC Centera Family", [online] © 2008, [retrieved on Aug. 19, 2008], retrieved from the Internet at <URL: http://www.emc.com/products/family/emc-centera-family.htm>, 2 pp.

FileNet Corp., "Business Process Manager", © 2003, 6 pp.

FileNet Corp., "Content Manager", © 2003, 6 pp.

FileNet Corp., "FileNet Content Manager Architecture", An Architecture White Paper, Feb. 2003, 47 pp.

FileNet Corp., "FileNet Business Process Manager", Technical White Paper, Aug. 2003, 48 pp.

FileNet Corp., "FileNet P8 Workplace", © 2003, 4 pp.

International Preliminary Report on Patentability (IPRP), Mar. 5, 2009, for PCT/US2005/013588, 10 pp.

International Search Report and Written Opinion, May 21, 2008, for PCT/US2005/13588, 14 pp.

NetApp, "NearStore on FAS", [online] © 2008, [retrieved on Aug. 19, 2008], retrieved from the Internet at <URL: http://www.netapp.com/us/products/storage-systems/nearstore-fas/>, 1 pp.

NetApp, "SnapLock Compliance and SnapLock Enterprise Software", [online] © 2008, [retrieved on Aug. 15, 2008], retrieved from the Internet at <URL: http://www.netapp.com/us/products/protection-software/snaplock.html>, 3 pp.

Notification Concerning Availability of the Publication of the International Application, Apr. 2, 2009, for International Application No. PCT/US2005/013588, 1 pg.

Shegda, K., "FileNet P8 Enterprise Content Management Solutions", Jun. 11, 2003 Product Report, Gartner, 13 pp.

Dourish, P. W.K. Edwards, A. Lamarca, J. Lamping, K. Petersen, M. Salisbury, D.B. Terry, and J. Thornton, "Extending Document Management Systems with User-Specific Active Properties", Xerox Palo Alto Research Center, © ACM, Apr. 2000, vol. 18, No. 2, Total 31 pp.

Office Action 1, Jul. 20, 2006, for U.S. Appl. No. 10/834,100, Total 18 pp.

Amendment 1, Oct. 10, 2006, for U.S. Appl. No. 10/834,100, Total 12 pp.

Notice of Allowance 1, Dec. 26, 2006, for U.S. Appl. No. 10/834,100, Total 18 pp.

Office Action 1, May 14, 2008, for U.S. Appl. No. 11/363,946, Total 24 pp.

Final Office Action 1, Nov. 10, 2008, for U.S. Appl. No. 11/363,946, Total 29 pp.

Notice of Allowance 1, Apr. 3, 2009, for U.S. Appl. No. 11/363,946, Total 28 pp.

Amendment 1, Aug. 14, 2008, for U.S. Appl. No. 11/363,946, Total 17 pp.

Amendment 2, Feb. 10, 2009, for U.S. Appl. No. 11/363,946, Total 16 pp.

Office Action 1, Sep. 5, 2008, for U.S. Appl. No. 11/741,688, Total 23 pp.

Final Office Action 1, Jan. 21, 2009, for U.S. Appl. No. 11/741,688, Total 24 pp.

Notice of Allowance 1, Jul. 6, 2009, for U.S. Appl. No. 11/741,688, Total 42 pp.

Amendment 1, Dec. 5, 2008, for U.S. Appl. No. 11/741,688, Total 9 pp.
Amendment 2, Apr. 21, 2009, for U.S. Appl. No. 11/741,688, Total 11 pp.
Office Action 1, Jul. 18, 2007, for U.S. Appl. No. 10/964,694, Total 22 pp.
Final Office Action 1, Mar. 21, 2008, for U.S. Appl. No. 10/964,694, Total 22 pp.
Office Action 3, Sep. 15, 2008, for U.S. Appl. No. 10/964,694, Total 43 pp.
Final Office Action 2, Mar. 19, 2009, for U.S. Appl. No. 10/964,694, Total 38 pp.
Office Action 5, Sep. 8, 2009, for U.S. Appl. No. 10/964,694, Total 46 pp.
Final Office Action 3, Apr. 16, 2010, for U.S. Appl. No. 10/964,694, Total 39 pp.
Preliminary Amendment, Mar. 3, 2006, for U.S. Appl. No. 10/964,694, Total 21 pp.
Amendment 1, Dec. 18, 2007, for U.S. Appl. No. 10/964,694, Total 19 pp.
Amendment 2, Jun. 23, 2008, for U.S. Appl. No. 10/964,694, Total 15 pp.
Amendment 3, Dec. 15, 2008, for U.S. Appl. No. 10/964,694, Total 17 pp.
Amendment 4, Jun. 19, 2009, for U.S. Appl. No. 10/964,694, Total 25 pp.
Amendment 5, Jan. 7, 2010, for U.S. Appl. No. 10/964,694, Total 27 pp.
Appeal Brief, Oct. 14, 2010, for U.S. Appl. No. 10/964,694, Total 46 pp.
Examiner's Answer, Feb. 3, 2011, for U.S. Appl. No. 10/964,694, Total 41 pp.
Pre-Appeal Brief Request for Review, Jul. 16, 2010, for U.S. Appl. No. 10/964,694, Total 6 pp.
Reply Brief, Mar. 31, 2011, for U.S. Appl. No. 10/964,694, Total 9 pp.
Panel Decision, Sep. 16, 2010, for U.S. Appl. No. 10/964,694, Total 2 pp.
Office Action 1, Apr. 30, 2009, for U.S. Appl. No. 11/251,831, Total 18 pp.
Final Office Action 1, Nov. 12, 2009, for U.S. Appl. No. 11/251,831, Total 36 pp.
Office Action 3, May 25, 2010, for U.S. Appl. No. 11/251,831, Total 23 pp.
Final Office Action 2, Nov. 12, 2010, for U.S. Appl. No. 11/251,831, Total 22 pp.
Amendment 1, Jul. 23, 2009, for U.S. Appl. No. 11/251,831, Total 14 pp.
Amendment 2, Feb. 12, 2010, for U.S. Appl. No. 11/251,831, Total 15 pp.
Amendment 3, Aug. 23, 2010, for U.S. Appl. No. 11/251,831, Total 16 pp.
Pre-Appeal Brief Request for Review, Feb. 10, 2011, for U.S. Appl. No. 11/251,831, Total 6 pp.
Panel Decision, Mar. 29, 2011, for U.S. Appl. No. 11/251,831, Total 2 pp.
Office Action 1, Nov. 20, 2007, for U.S. Appl. No. 11/255,534, Total 21 pp.
Final Office Action 1, Jul. 22, 2008, for U.S. Appl. No. 11/255,534, Total 21 pp.
Office Action 3, Nov. 26, 2008, for U.S. Appl. No. 11/255,534, Total 16 pp.
Final Office Action 2, May 13, 2009, for U.S. Appl. No. 11/255,534, Total 19 pp.
Office Action 5, May 14, 2010, for U.S. Appl. No. 11/255,534, Total 16 pp.
Final Office Action 3, Oct. 21, 2010, for U.S. Appl. No. 11/255,534, Total 18 pp.
Notice of Allowance 1, Nov. 18, 2009, for U.S. Appl. No. 11/255,534, Total 22 pp.
Amendment 1, Mar. 20, 2008, for U.S. Appl. No. 11/255,534, Total 13 pp.
Amendment 2, Oct. 20, 2008, for U.S. Appl. No. 11/255,534, Total 8 pp.
Amendment 3, Feb. 26, 2009, for U.S. Appl. No. 11/255,534, Total 12 pp.
Amendment 4, Aug. 13, 2009, for U.S. Appl. No. 11/255,534 Total 16 pp.
Amendment 5, Feb. 17, 2010, for U.S. Appl. No. 11/255,534, Total 10 pp.
Amendment 6, Aug. 16, 2010, for U.S. Appl. No. 11/255,534, Total 13 pp.
Amendment 7, Jan. 12, 2011, for U.S. Appl. No. 11/255,534, Total 12 pp.
Office Action 1, Dec. 24, 2008, for U.S. Appl. No. 11/254,604, Total 9 pp.
Final Office Action 1, Aug. 21, 2009, for U.S. Appl. No. 11/254,604, Total 27 pp.
Office Action 3, Dec. 28, 2009, for U.S. Appl. No. 11/254,604, Total 16 pp.
Final Office Action 2, Jul. 8, 2010, for U.S. Appl. No. 11/254,604, Total 13 pp.
Amendment 1, Apr. 24, 2009, for U.S. Appl. No. 11/254,604, Total 13 pp.
Amendment 2, Nov. 23, 2009, for U.S. Appl. No. 11/254,604, Total 15 pp.
Amendment 3, Apr. 16, 2010, for U.S. Appl. No. 11/254,604, Total 13 pp.
Appeal Brief, Jan. 6, 2011, for U.S. Appl. No. 11/254,604, Total 22 pp.
Examiner's Answer, Mar. 30, 2011, for U.S. Appl. No. 11/254,604, Total 15 pp.
Pre-Appeal Brief Request for Review, Oct. 8, 2010, for U.S. Appl. No. 11/254,604, Total 6 pp.
Panel Decision, Dec. 6, 2010, for U.S. Appl. No. 11/254,604, Total 2 pp.
Office Action 1, Mar. 14, 2008, for U.S. Appl. No. 11/317,712, Total 31 pp.
Final Office Action 1, Oct. 9, 2008, for U.S. Appl. No. 11/317,712, Total 29 pp.
Office Action 3, Apr. 3, 2009, for U.S. Appl. No. 11/317,712, Total 57 pp.
Final Office Action 2, Oct. 5, 2009, for U.S. Appl. No. 11/317,712, Total 57 pp.
Office Action 5, Feb. 25, 2010, for U.S. Appl. No. 11/317,712, Total 47 pp.
Notice of Allowance 1, Aug. 6, 2010, for U.S. Appl. No. 11/317,712, Total 31 pp.
Amendment 1, Jun. 16, 2008, for U.S. Appl. No. 11/317,712, Total 16 pp.
Amendment 2, Jan. 9, 2009, for U.S. Appl. No. 11/317,712, Total 24 pp.
Amendment 3, Jul. 6, 2009, for U.S. Appl. No. 11/317,712, Total 26 pp.
Amendment 4, Jan. 5, 2010, for U.S. Appl. No. 11/317,712, Total 30 pp.
Amendment 5, May 25, 2010, for U.S. Appl. No. 11/317,712, Total 23 pp.
Office Action 1, Mar. 3, 2008, for U.S. Appl. No. 11/401,994, Total 17 pp.
Final Office Action 1, Aug. 12, 2008, for U.S. Appl. No. 11/401,994, Total 14 pp.
Notice of Allowance 1, Jan. 28, 2009, for U.S. Appl. No. 11/401,994, Total 20 pp.
Notice of Allowance 2, Jul. 6, 2009, for U.S. Appl. No. 11/401,994, Total 17 pp.
Amendment 1, Jun. 3, 2008, for U.S. Appl. No. 11/401,994, Total 8 pp.
Amendment 2, Nov. 12, 2008, for U.S. Appl. No. 11/401,994, Total 10 pp.
Amendment 3, Apr. 27, 2009, for U.S. Appl. No. 11/401,994, Total 11 pp.
SearchExpress, "Records Management Software Lets You Index, Retrieve, Distribute and Archive your Records", [online], [retrieved on Jul. 15, 2005], retrieved from the Internet at <URL: http://www.searchexpress.com/records-management.html>, 3 pp.

* cited by examiner

AUTOMATED RECORDS MANAGEMENT WITH HOLD NOTIFICATION AND AUTOMATIC RECEIPTS

BACKGROUND

1. Field

The present disclosure relates generally to records management and, more particularly, to tracking notifications to users of an automated records management system.

2. Related Art

Records management has become increasingly essential to the success and future of a business. Technological advances have given rise to greater reliance on electronic information in dispersed data systems. The amount of information to be gathered has also increased. For example, the Internet and its e-mail and web-based content gathering capabilities have aided the proliferation of data such as never before seen. The increasing amount of hard copy information has aided this proliferation as well.

Along with technological advances and the widespread propagation of data, a new age of corporate governance has also resulted in a greater emphasis on records management. Emphasis on issues such as corporate fraud have led to large-scale corporate liability and corporate failures. Greater focus is being given to corporations and their executives, as well as corporate compliance with new laws enacted as a part of this new age of corporate governance.

Corporate non-compliance is a major source of corporate liability, resulting in increased complexity for records management systems. Many compliance policies have been embodied in legislation. The Sarbanes-Oxley Act and the Health Insurance Portability and Accountability Act of 1996 are examples of such legislation. Due to regulations such as these, it may be deemed necessary for a corporation to manage and maintain its records in a particular manner. Similarly, some courts have awarded judgments against various companies for the manner in which they negligently managed their records and/or destroyed records (e.g., *Zubulake* v. *UBS Warburg LLC*).

A significant number of companies now maintain formal records management programs, and it is widely agreed that such programs are important to the success of a business. However, current records management programs may not address the needs of today's businesses in that they have not been updated in accordance with technological advances. For example, many of today's records management programs do not incorporate electronic records.

Current records management programs may also lack protections that promote the consistent application and enforcement of records management policies. For example, some information technology systems may not be structured to support desired records management policies. Moreover, records may be incorrectly classified due to differences of opinion among users that manually perform classification operations.

One particular instance in which current records management programs have been deficient relates to ensuring that owners of records which have been put on hold are periodically reminded of the status of such records. Furthermore, improvements are also needed in the way records-related notifications sent to users are tracked and recorded.

SUMMARY

The present disclosure addresses the needs noted above. One aspect of the present invention relates to a computer-based method for managing records. In accordance with this aspect, one or more records are identified within a records management system that have an associated hold and one or more users associated with the one or more records are identified. A respective e-mail message regarding the hold is sent to each of the one or more users; and a respective receipt, in response to the e-mail message, is collected from the one or more users. This allows users to be identified who do not open the e-mail message and to notify others, such as supervisors, of this activity.

Another aspect of the present invention relates to a computer-based method for managing records that automatically declares records from e-mail receipts. First, one or more records within a records management system that are associated with an e-mail message are identified when delivering the e-mail message to one or more recipients. A respective receipt in response to the e-mail message is received from at least one of the one or more recipients; and the respective receipt is automatically declared as a new record within the records management system.

It is understood that other embodiments of the present disclosure will become readily apparent to those skilled in the art from the following detailed description, wherein it is shown and described only exemplary embodiments of the disclosure by way of illustration.

BRIEF DESCRIPTION OF DRAWINGS

Aspects of the present disclosure are illustrated by way of example, and not by way of limitation, in the accompanying drawings wherein.

DETAILED DESCRIPTION OF THE PRESENT DISCLOSURE

Application Architecture for a Content Management System

Figure 1:
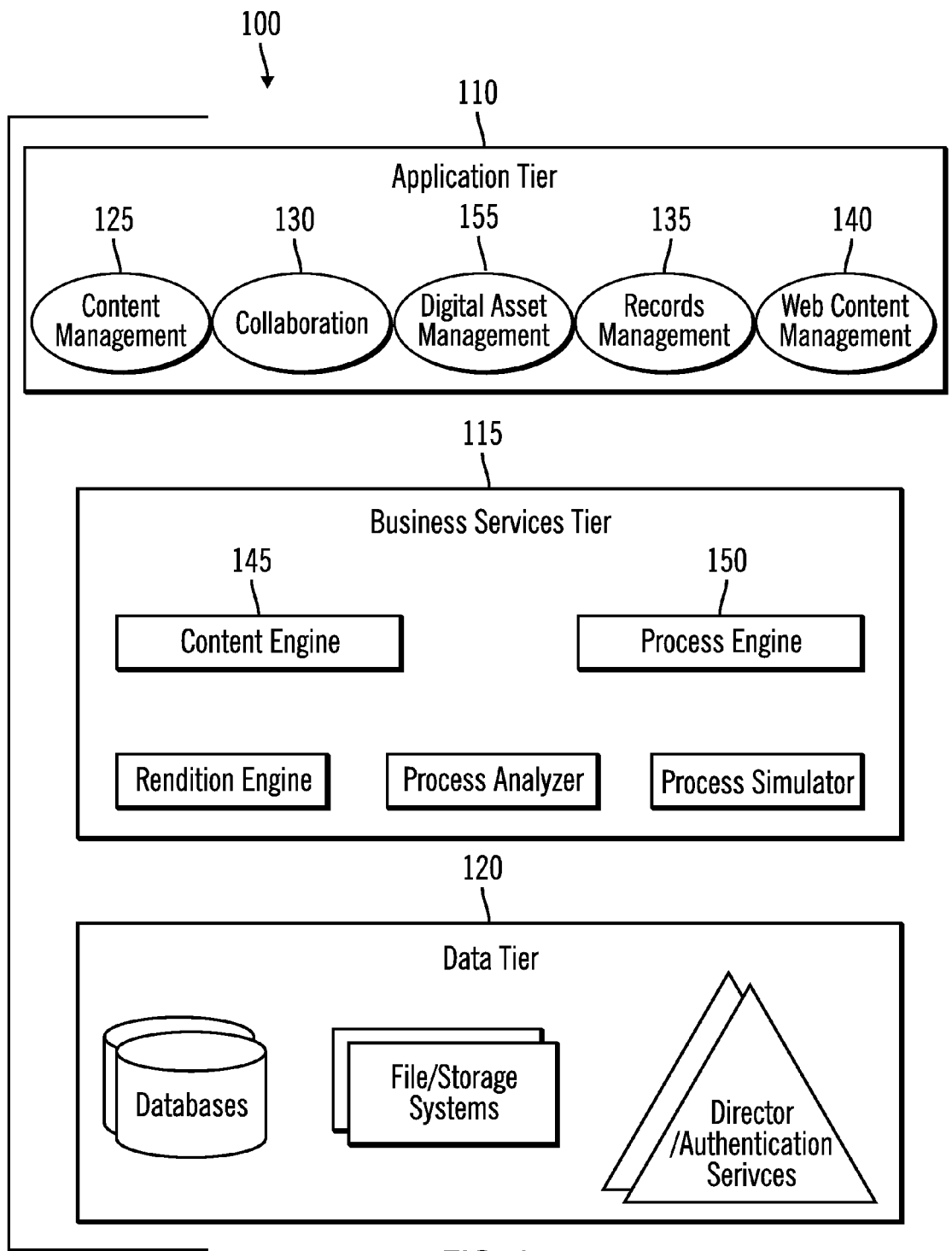
FIG. 1 illustrates an exemplary architecture for a computer-based content management system.

Reviewing the general architecture for a Content Management System and referring now to FIG. 1, illustrated is a block diagram 100 representation of an architecture of a content management system, including an application tier 110, a business services tier 115, and a data tier 120. A single architecture may be provided thereby for content management 125, records management 135, web content management 140, collaboration 130 and digital asset management 155 at the application tier, while a content engine 145 and a process engine 150 are used to manage the content and process for all the separate functions indicated as content management 125, records management 135, web content management 140, collaboration 130 and digital asset management 155. One of ordinary skill will recognize that this architecture is exemplary in nature and its logical functions may be re-arranged without departing from the scope of the present invention.

Using this architecture, system events can trigger actions in any part of the system. When content is added to the system, events may publish the content to the web or declare it as a record. In this manner, a file plan may be populated with record information within the system, and content may be managed both inside and outside the system.

The records management system 135, the process engine 150, the content engine 145, and the data tier 120 shown in FIG. 1 may be configured to monitor the value(s) of one or more events or actions associated with one or more of the data objects associated with records or the file plan. In response to this monitoring and based on one or more pre-defined rules and/or conditions, the records management system 135 may be configured to automatically initiate one or more processes in the process engine system 150. For example, after user declaration of an asset as a record, the system may automatically classify one or more of the records or store information associated with one or more of these records in the records management system. One or more of these processes may in addition or instead apply one or more pre-defined retention periods or disposition rules to one or more of the records.

Alternatively, one or more of the various management systems may be separate, stand-alone systems that have been brought together and integrated merely for the purpose of creating the records management system. The records management application may be accessed by a user, whether a regular end user, records administrator, records manager or reviewer (privileged user) over a Java-based API that indicates the pertinent records management operation that the user can perform. These operations may include a declaration API, a record management API, a disposition API and a file plan management API. The APIs may incorporate XML technology for ease of use, as well as ease of import and export of information in the records management system.

The records management system described herein may be used to declare, classify and manage records of different types, secure repositories that contain records, create retention and disposition rules for records, control access to records, retrieve records based on search criteria, destroy records that are no longer used, review vital records, and add records with minimal user intervention.

The architecture of FIG. 1 may be implemented on a variety of programmable computer platforms. Such a computer processing system or platform may include a single computer or multiple computers and/or processors. When using multiple computers and/or processors, the multiple computers and/or processors may be at a single location or at several locations. When using multiple computers and/or processors, the multiple computers and/or processors may be interconnected by a network system such as a local area network, a wide area network, and/or the Internet. Within such computer platforms are typically memory systems that may include any type of memory system, including one or more hard disk drives, magnetic tape drives and/or RAMs. The memory system may consist of a single device or multiple devices. When multiple devices are used, they may all be located in close proximity to each other, or at different locations. When multiple devices are used, appropriate hardware and/or software may be used to facilitate their intercommunication.

File Plans and Disposition Schedules

The records management systems, methods and computer readable media of the present disclosure are designed to manage records of various types, including but not limited to, electronic documents and e-mails, physical records or artifacts, vital records and permanent records. A record can be any information asset that an organization desires to maintain and manage in a reliable manner.

Record declaration may be performed when a potential record is added to the system. In the case of electronic content, declaration may occur when a document is created or published, or upon the creation of a new document version, or when an e-mail is transmitted. For electronic documents as well as other types of records, the records may be automatically declared based on other, prior user input or business context. In the case of a physical artifact, declaration may occur, for example, when the physical artifact is received by a company. Records may also be generated in a variety of other uses and applications, e.g., part of a transaction, or during the course of a process. Process-centric records may be created as part of a company's line of business.

Advantageously, the records are organized according to some hierarchy often referred to as a file plan that contains an organized arrangement of data containers used to store documents and records. Typically, a disposition schedule is associated with the different data containers that defines the retention policy related to records stored in that particular data container. A single person, such as a records administrator, may be charged with responsibilities for designing a classification scheme, defining a new file plan, configuring naming patterns and phases, as well as defining and modifying disposition schedules. Major categories of the file plan may be category hierarchy and disposition schedules.

Figure 2:
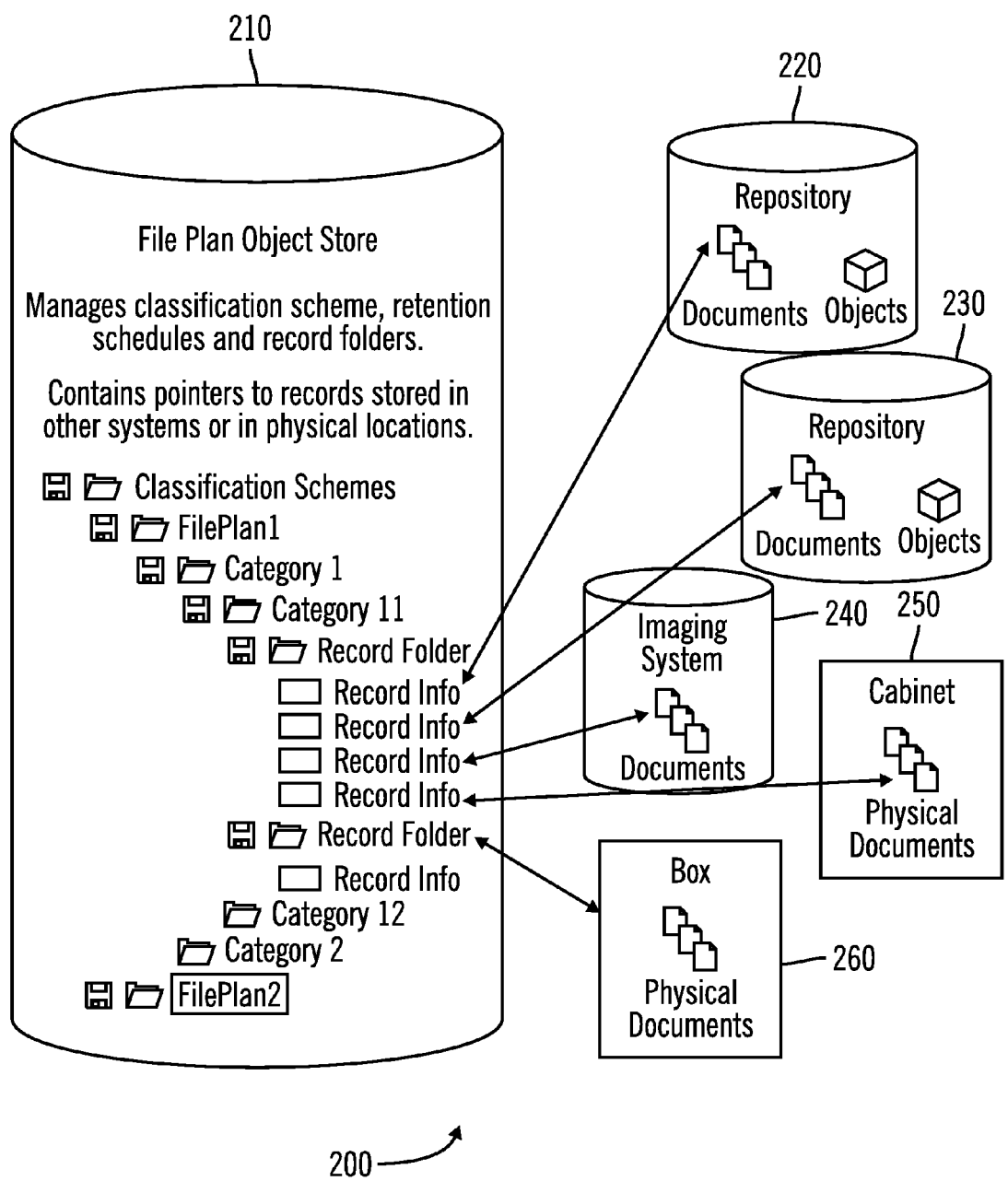
FIG. 2 illustrates a data model that can be used for a file plan in accordance with one embodiment of the present disclosure.

Referring now to FIG. 2, illustrated is one embodiment of a data model 200 that can be used for a file plan in accordance with the present disclosure. In this illustration, the file plan is used to manage records across object stores and repositories. As illustrated, the file plan uses a file plan object store 210 which manages classification schemes, retention schedules and record folders. The file plan object store 210 contains pointers to records stored in other systems or in physical locations. This file plan object store also incorporates a category hierarchy which may be the primary classification for records, and may include categories, as well as various types of folders and corresponding volumes. More particularly, the file plan may incorporate a classification scheme, record category, record folder, record part or record type that can be used to manage the record.

The category hierarchy may also include a tree structure defining how records are organized, and the category hierarchy may also propagate security and support disposition schedules. The category hierarchy may include a flexible hierarchical structure that is designed to fit the unique needs of an organization. For example, a top level may be "Accounting" with sublevels of "AR" and "AP." Another top level may be "HR" with sublevels of "Policy" and "Resumes." The category hierarchy may determine the scheme for classifying records in combination with events or business context so that the records may be automatically classified by a records management system, without user intervention.

The category hierarchy may be determined by business function. For example, a category hierarchy may be organized according to a function/activity/transaction model wherein the first level determines functional groupings, the second level determines activities within the function, and the lowest level represents a transaction. The hierarchy may also be designed to facilitate access. In this manner, security may be more easily controlled, user access in terms of browsing may provide better performance and the hierarchy may facilitate aggregation for purposes of disposition.

Alternatively to file plan design based on business function, a file plan may be designed so that each folder in the category is a client file that contains that particular client's records, and once the client folder is closed, cutoff may be triggered so that active use of the record ends and it begins its retention period.

As yet another alternative to file plan design based on business function, a file plan may be designed so that different types of records are filed into different folders. As yet another alternative, the file plan may be designed so that each subcategory represents a project, and each project may have a collection of folders to manage different records related to the project. An external event related to a project milestone may be used to trigger cutoff so that active use of the record ends and the retention period begins.

The record category may be added to the root of the file plan. The record category may also be added as a subcategory to an existing category to establish a hierarchy. The required properties of a category may be the category name which may be descriptive of the category, the category identifier which may be a more cryptic string identifier often containing a numeric code, and a reviewer which may default to the user who is adding the category.

A record folder may be added to a category. Conceptually, the record folder may be the most common level for managing records. The required properties for a folder may include the folder class such as a content engine object class defining the type of folder. The folder class may be defined by the data model. The folder properties may also include a name, identifier and reviewer much like the record category.

Generally, a record folder may not contain sub-folders, but may contain volumes. The first volume may be automatically added when the record folder is created, and a name may be automatically generated based on the folder name. When a new volume is added, the previous volume may be automatically closed. Volumes may be used to partition groups of records, whether similar or not. For example, a record folder may contain all invoices while volumes may be used to partition by month. A volume may be required to include a reviewer, which may default to the user requesting the volume.

As shown in FIG. 2, the data objects and physical repositories 220, 230, 240, 250, 260 may be configured in conformance with the classic model of a software object that has been developed in object-oriented programming to include one or more attributes and one or more methods.

A broad variety of characteristics may be assigned as attributes to the file plan object 210, object stores 220, 230 and other objects. For example, these objects may incorporate attributes that are related to the records that are embodied in the software object such as a name for the record, a description of the record, the type of record, an identification of the holders of the record. Audit information may also be contained as an attribute relating to the record such as who accesses an object, when it is modified, who authorizes the modification, who generates documentation related to the object or repository, and when these events take place. Electronic signatures that may have been procured in connection with an object store such as object stores 210, 220, 230 may be contained as an attribute. Notifications that should be issued upon a change in an aspect of a data object, security information relating to a data object, status information that is associated with the record (such as lost item), relevant dates (e.g., creation date, expiry date, and/or key timelines, including multiple, periodic or cyclical information), and relationships between the record software object and other components may be contained as attributes.

Although each of these characteristics may be illustrated as an attribute of the object, each of these may also or instead be stored as separate components or objects in the record management system.

The data model 200 includes pointers from the file plan object store 210 to records stored in other systems or locations. One such pointer is to object stores related to documents 220, 230 which are the main record types and thus use more space. The data model also includes pointers to an image service repository 240, a cabinet repository for physical documents 250 that may be located in cabinets, as well as a box repository for physical documents 260 that may be located in boxes. This design provides for a file plan that incorporates an intuitive scheme that can be readily used by the records administrator to generate a file plan. Based on this user-friendly structure, a records administrator may customize the file plan to fit the company's needs.

Methods may be related to the records, including methods that include or relate to retention and disposition rules, timed events, notifications, reports and trends and forecasts. Each of these methods may constitute software subroutines that initiate, alter or interrupt one or more processes. As with the attributes, the methods may be stored separately from the file plan object store or data object in another object or component.

Record Hold Notification

Within a records management system as just described, there are occasions when a record, or set of records, is subject to a hold; which means that the records should not be destroyed until the hold is lifted. Typically, the company utilizing the records management system designates an operator that has responsibility for marking the records which are subject to a hold. However, the determination that a hold is needed may be made by a variety of parties within the company. For example, the legal department may realize that certain records need to be preserved because of an ongoing or pending litigation. Similarly, the IT department or a corporate officer may determine that there is an obligation to preserve certain records. In such instances, those records are identified in the fileplan and a hold is placed on them.

Figure 3:
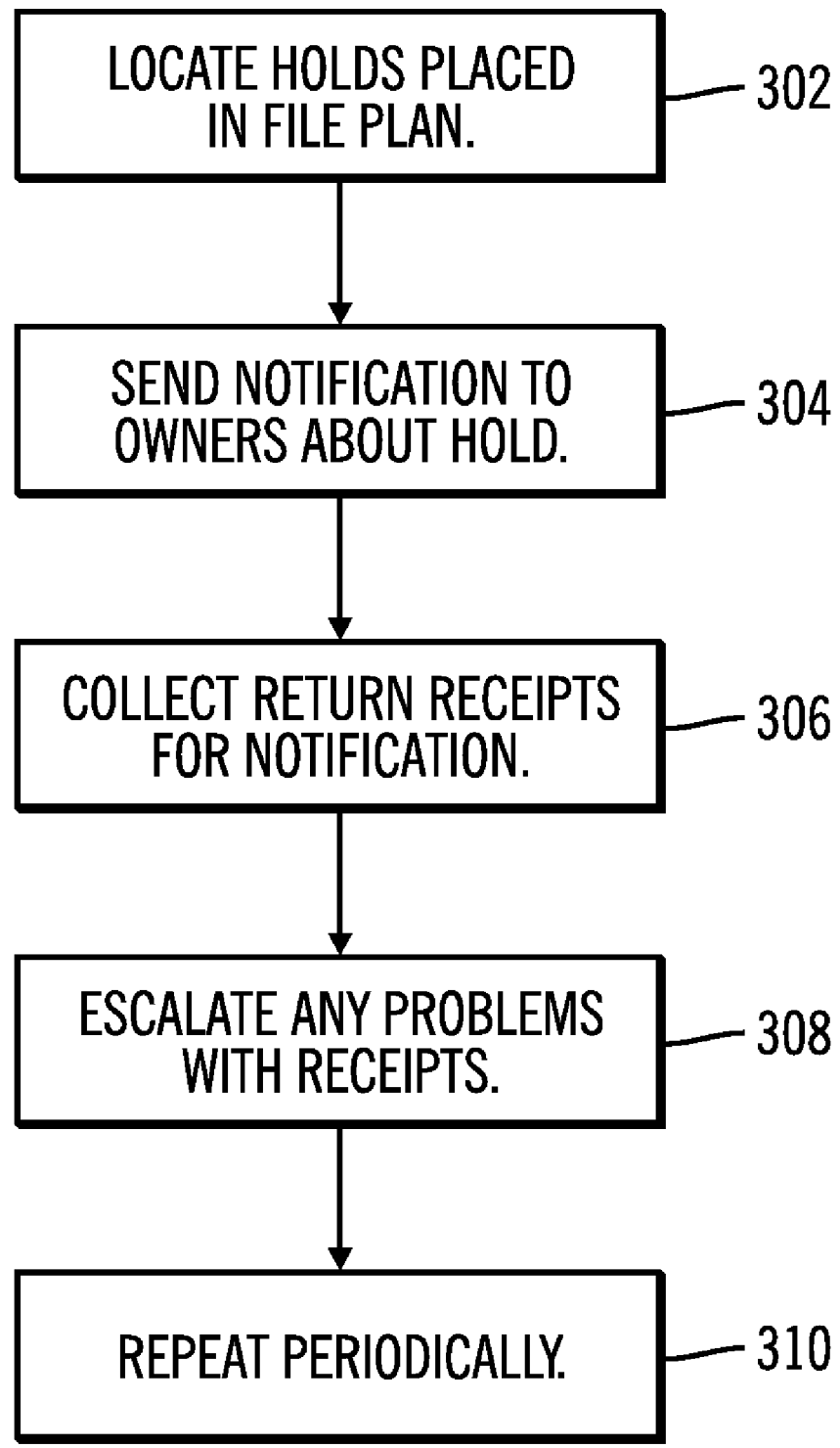
FIG. 3 depicts a flowchart of an exemplary method for periodically notifying users of hold status for certain records.

These records may be electronic records or physical records. In the case of electronic records, the records management system may protect the records from being destroyed but in the case of physical records, the owner or manager of those records will need to prevent their destruction. In either case, a variety of people having some relation to the records placed on hold should be notified about the records' status. FIG. 3 depicts a flowchart of an exemplary method for managing notifications regarding records on hold.

In step 302, those records in the fileplan over which a "hold" has been placed are identified. As mentioned previously, holds may be placed for a number of reasons and may specify a single record or a group of related records. Part of the information associated with the fileplan includes the owner of a record and may also include a records manager for that record. Other people who may have possession of the record or are somehow responsible for it may be identified as well by the fileplan.

The records management system sends, in step 304, a notification to the owners/managers that certain records are on hold. When the hold is placed on the records, a notification message may be created that further explains the nature of the hold and the expected actions of anyone who receives the notification. For example, the notification may explain what records are on hold and why they are on hold. It may instruct the receiver to return that record and any other related record to the record center or some other area for safe keeping. Record center managers may receive a different notification message which along with identifying records on hold, may identify who has the records (and needs to return them) and who may or may not access the records. The notifications are preferably sent via e-mail to the record authors, owners and/ or managers or by registered mail, workflow system, physical memos and automatic telephone call.

An e-mail manager application that is part of the records management system or interfaces with the records management system is used to generate the e-mails. The e-mail messages are constructed so that upon being opened, a receipt is returned to the e-mail manager. In step 306, the e-mail manager collects the receipts that are returned in order to identify anyone who has not opened the e-mail notification about the records' hold. Various rules may be defined for how the e-mail manager handles non-responders. For example, a follow-up message may be sent after three days. Alternatively, a follow-up message may be sent, in step 308, to a record owners supervisor or the corporate counsel.

In another embodiment, the process engine generates the emails and collects the receipts in step 306, in order to identify anyone who has not opened the e-mail notification about the records' hold. Various rules may be defined for how the process engine handles non-responders. For example, a follow-up message may be sent after three days. Alternatively, a follow-up message may be sent by the process engine, in step 308, to a record owners supervisor or the corporate counsel.

As indicated by step 310, the process can repeat itself periodically. For example, every evening, an automated process may run across the entire fileplan so that notifications are sent for all records which have been placed on hold. More realistically, the hold notification process may occur on a weekly or monthly basis depending on what various laws may require or what court judgments have indicated is prudent records management. In addition to the periodic sending of notifications, the process may be initiated each time an operator places a record on hold within the records management system. In this way, record owners/managers may be periodically notified of records that should not be destroyed and/or records that need to be returned to a records center or other safe location. Furthermore, by tracking who does and does not open the notification messages, the system can provide some record of what corrective action has been taken in order to comply with the hold order.

Automatic Declaration of E-Mail Receipts

As mentioned in the discussion of the records management system of FIGS. 1 and 2, there are a variety of different ways that records may be declared and also different ways that records may be linked together. In some instances, the records are electronic documents that are received within the records management system. In other instances, one or more records may be automatically created while processing another record. Also, a physical record may be received and scanned in, for example, or otherwise used to generate a record that is managed within the system.

Figure 4:
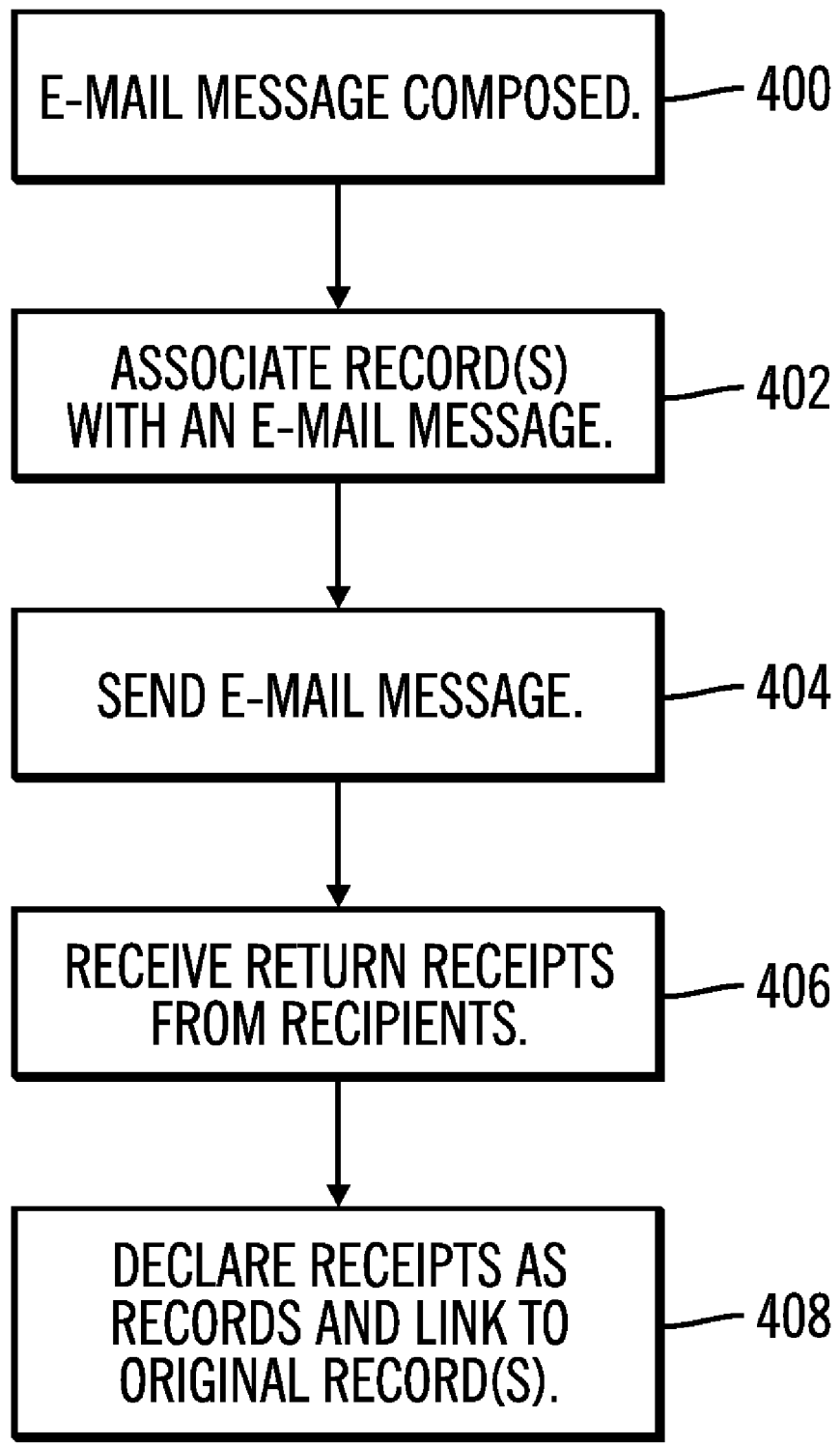
FIG. 4 depicts a flowchart of an exemplary method for automatically declaring e-mail return receipts as records.

FIG. 4 depicts a flowchart of an exemplary method that automatically declares records related to e-mail receipts. This flowchart may be performed using the e-mail manager described previously or some other software application. For example, the records management system may include functionality that interfaces with e-mail server or the e-mail server, itself, may be part of the records management system. Alternatively, a process engine could be used to integrate the e-mail server with the records management system to implement the processes of FIG. 4. In step 400 a user composes an e-mail message that relates to one or more records managed within the records management system. Once an e-mail message is created the e-mail manager can associate the message with one or more records. For example, the message may include the record as an attachment or it may simply refer to the pertinent record within the body of the message. Alternatively, the user composing the e-mail message may be prompted to explicitly identify the record(s). In any case, the e-mail manager identifies, from the e-mail message, the associated record(s); in step 402.

In step 404, the e-mail message is sent to the recipients. When the recipients open the e-mail message, a return receipt is generated. The e-mail manager collects, in step 406, the return receipts. Furthermore, in step 408, the return receipts are automatically declared as records in the fileplan and are linked to the original record(s) that was associated with the e-mail message.

The e-mail message may, for example, detail the secrecy that should be accorded a particular record. The e-mail message allows the secrecy instructions to be disseminated and the return receipts acknowledge that a user was properly informed of these instructions. Furthermore, by linking the return receipts with the original record(s), the disposition of the return receipts may be controlled based on the disposition of the original record(s). In other words, the return receipt records may be prevented from destruction until the underlying record has been destroyed or passes a particular milestone (e.g., approval, etc.).

The receipts for physical records may be declared as records as well. For example, if a physical record is delivered via FEDERAL EXPRESS® (FEDERAL EXPRESS is a registered trademark of Federal Express Corporation), or similar service, then that physical receipt can be scanned as an electronic document and declared a record.

The previous description of the disclosed embodiments is provided to enable one skilled in the art to make or use the present disclosure. Various modifications to these embodiments will be readily apparent to those skilled in the art. The principles set forth herein may be applied to other embodiments without departing from the spirit or scope of the disclosure. Thus, the present disclosure is not intended to be limited to the embodiments shown herein but is to be accorded the widest scope consistent with the principles and novel features disclosed herein.

We claim:

1. A method for managing records, comprising:
 at a computer with a processor and with a records management system and a process engine,
  in response to a user composing an e-mail message that relates to one or more records that are managed within the records management system and that are each attached to the e-mail message, identifying the one or more records from the e-mail message, wherein the one or more records are stored in a category of a file plan, and wherein the category has associated disposition rules;
  delivering the e-mail message to one or more recipients;
  receiving a respective receipt in response to the e-mail message from at least one of the one or more recipients, wherein the receipt is returned upon the e-mail message being opened; and
  for each received respective receipt,
   declaring the respective receipt as a new record within the records management system;
   storing the new record of the respective receipt in the category of the file plan storing the identified one or more records;
   initiating a process in the process engine to apply one or more pre-defined disposition rules to the new record of the respective receipt that are associated with the category; and
   controlling disposition of the new record of the respective receipt based on the disposition schedule in the category of the file plan for the one or more identified records to prevent destruction of the new record of the respective receipt until the one or more identified records have passed a particular milestone.

2. The method of claim 1, wherein the e-mail message is linked to the one or more identified records.

3. A records repository system comprising:

a processor, a memory system;

an e-mail manager configured to receive an e-mail message that relates to one or more records that are managed within the records management system and that are each attached to the e-mail message;

the e-mail manager further configured to forward the e-mail message to one or more recipients;

a records management system and a process engine, wherein the records management system is in communication with the e-mail manager and configured to manage a plurality of records;

the e-mail manager further configured to identify the one or more records from the e-mail message and to receive respective receipts from the one or more recipients of the e-mail message, wherein the respective receipts are returned upon the e-mail message being opened; and the records management system further configured to store the identified one or more records in a category of a file plan, wherein the category has associated disposition rules; and for each of the respective receipts, the records management system further configured to declare each of the respective receipts as a new record within a file plan of the records management system;

the records management system further configured to store each new record of the respective receipts in the category of the file plan storing the identified one or more records;

the records management system further configured to initiate a process in the process engine to apply one or more pre-defined disposition rules to each new record of the respective receipts that are associated with the category; and the records management system further configured to control disposition of each new record based on the disposition schedule in the category of the file plan for the identified record to prevent destruction of each new record until the identified record has passed a particular milestone.

4. The system of claim 3, wherein the e-mail message is linked to the identified record.

5. Computer-readable storage media containing programming for managing records that, when executed on a computer, causes a processor to perform:

with a records management system and a process engine, in response to a user composing an e-mail message that relates to one or more records that are managed within the records management system and that are each attached to the e-mail message, identifying the one or more records from the e-mail message, wherein the one or more records are stored in a category of a file plan, and wherein the category has associated disposition rules;

delivering the e-mail message to one or more recipients;

receiving a respective receipt in response to the e-mail message from at least one of the one or more recipients, wherein the receipt is returned upon the e-mail message being opened; and for each received respective receipt, declaring the respective receipt as a new record within a file plan of the records management system;

storing the new record of the respective receipt in the category of the file plan storing the identified one or more records;

initiating a process in the process engine to apply one or more pre-defined disposition rules to the new record that are associated with the category; and controlling disposition of the new record of the respective receipt based on the disposition schedule in the category of the file plan for the one or more identified records to prevent destruction of the new record of the respective receipt until the one or more identified records have passed a particular milestone.

6. The media of claim 5, wherein the e-mail message is linked to the identified record.

\* \* \* \* \*